United States Patent
Adriansens et al.

(10) Patent No.: US 7,938,639 B2
(45) Date of Patent: *May 10, 2011

(54) INSTALLATION FOR THE MANUFACTURE OF CONTAINERS COMPRISING A SECURE ENCLOSURE PROVIDED WITH A SYSTEM FOR THE INSUFFLATION OF FILTERED AIR

(75) Inventors: Eric Adriansens, Octeville sur Mer (FR); François Quetel, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 497 days.

This patent is subject to a terminal disclaimer.

(21) Appl. No.: 12/105,296

(22) Filed: Apr. 18, 2008

(65) Prior Publication Data

US 2008/0260887 A1   Oct. 23, 2008

(30) Foreign Application Priority Data

Apr. 20, 2007  (FR) .................................... 07 54594

(51) Int. Cl.
*B29C 49/36* (2006.01)
*B29C 49/68* (2006.01)

(52) U.S. Cl. ......... 425/210; 425/526; 425/534; 425/540

(58) Field of Classification Search ............. 425/73, 425/210, 526, 534, 540
See application file for complete search history.

(56) References Cited

U.S. PATENT DOCUMENTS

| | | | | |
|---|---|---|---|---|
| 4,880,581 A | * | 11/1989 | Dastoli et al. | 425/210 |
| 5,759,218 A | * | 6/1998 | Martin et al. | 425/534 |
| 6,562,281 B1 | * | 5/2003 | Marchau et al. | 425/526 |
| 6,770,238 B2 | * | 8/2004 | Choinski | 425/526 |
| 2009/0317506 A1 | * | 12/2009 | Adriansens | 425/103 |
| 2010/0213629 A1 | * | 8/2010 | Adriansens | 264/40.5 |

FOREIGN PATENT DOCUMENTS

| | | | |
|---|---|---|---|
| EP | 464933 A2 | * | 1/1992 |
| JP | 08282789 A | * | 10/1996 |

OTHER PUBLICATIONS

Partial machine translation of JP-08282789-A dated Oct. 1996 obtained from the JPO website.*

* cited by examiner

*Primary Examiner* — Robert B Davis
(74) *Attorney, Agent, or Firm* — Young & Thompson

(57) ABSTRACT

The present invention relates to an installation (10) for the manufacture of containers, in particular bottles, by blow moulding or stretch blow moulding from a thermoplastic preform, characterized in that the installation (10) comprises a system (70) for the insufflation of filtered air inside the enclosure (52) thereof to create an excess pressure therein by projecting a flow (F) of air therein which is selectively introduced into at least one first zone (Z1) so as to avoid the risks of specific airborne contamination.

20 Claims, 1 Drawing Sheet

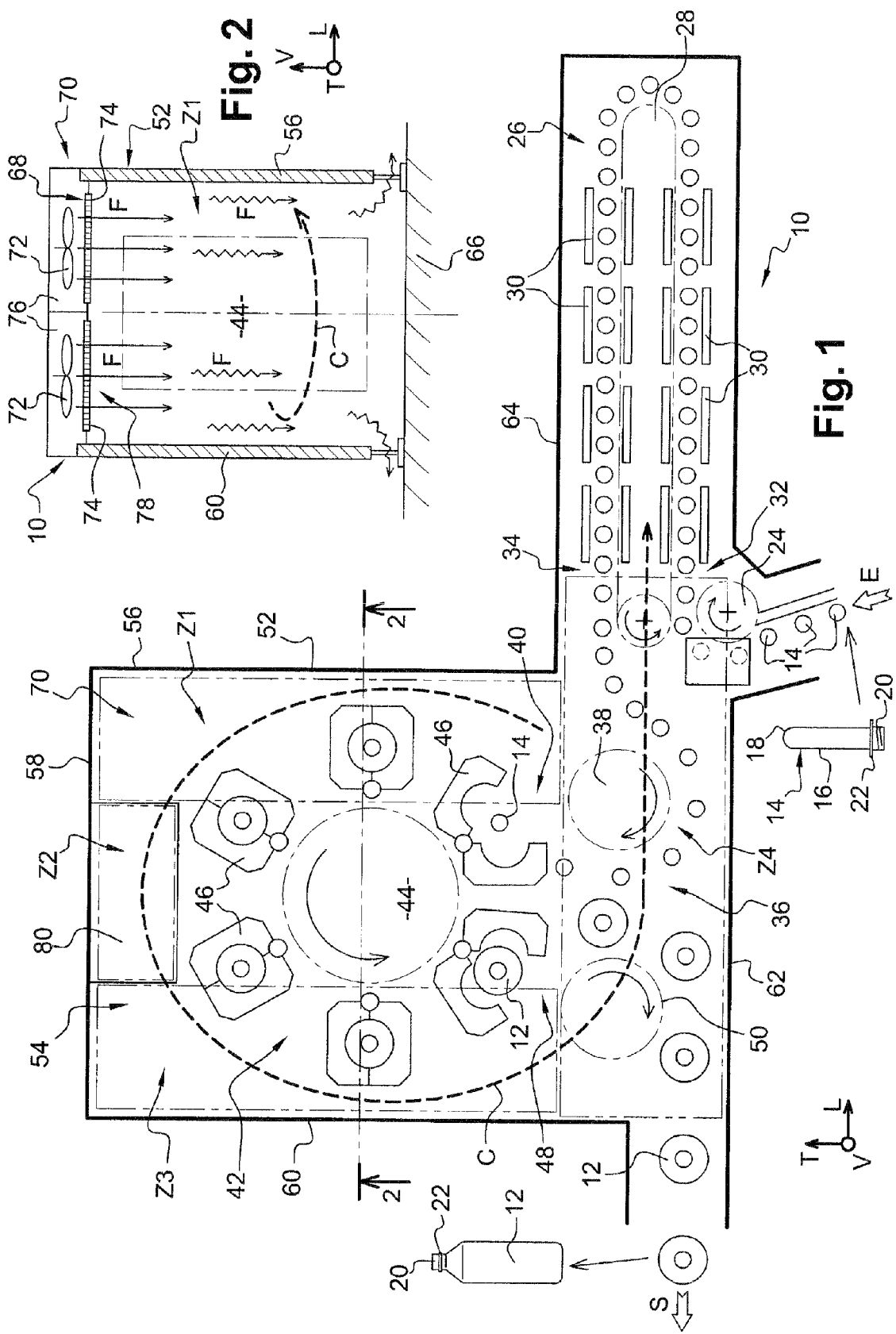

INSTALLATION FOR THE MANUFACTURE OF CONTAINERS COMPRISING A SECURE ENCLOSURE PROVIDED WITH A SYSTEM FOR THE INSUFFLATION OF FILTERED AIR

The present invention relates to an installation for the manufacture of containers comprising a secure enclosure provided with a system for the insufflation of filtered air.

The invention relates more particularly to an installation for the manufacture of containers, in particular bottles, by blow moulding or stretch blow moulding from a thermoplastic preform, the installation comprising at least:
- a device for supplying preforms intended for supplying preforms to an inlet of the installation,
- a thermal conditioning unit comprising at least one oven, comprising means for heating the preforms which are arranged between an inlet zone into which the preforms are fed by the supply device and an outlet zone which discharges into a zone of the installation, known as the transfer zone,
- a first transfer device which, arranged in the transfer zone, is intended to transfer thermally conditioned preforms from the outlet zone of the oven to a zone, known as the supply zone, of a moulding unit,
- the moulding unit comprising a wheel provided with a plurality of moulds distributed circumferentially and associated blow moulding or stretch blow moulding means, the wheel being driven in rotation so that each mould passes through a transformation cycle from said supply zone to a so-called discharge zone,
- a second transfer device which, arranged in the transfer zone, is intended to transfer the containers obtained from the discharge zone of the moulding unit to an outlet of the installation, and
- at least one secure enclosure forming a casing, arranged so as to surround at least the moulding unit, the transfer zone and the outlet zone of the oven of the installation, the enclosure defining in particular around the wheel a peripheral U-shaped zone which, extending from the supply zone as far as the discharge zone, successively comprises a first zone, known as the lateral right-hand zone, a second zone, known as the rear zone, and a third zone, known as the lateral left-hand zone.

Numerous installations of this type are known for the manufacture of containers in which the secure enclosure generally comprises vertical walls and at least one horizontal wall forming a ceiling so as to form a casing which is arranged so as to surround at least the moulding unit, the transfer zone and the outlet zone of the oven of the installation.

The protective enclosure is, in particular, intended to ensure a physical "man-machine" separation for reasons of operational safety, in addition to acoustic insulation in order to respect the current regulations.

Such an enclosure is not necessarily sealed and there is a possible circulation of air, albeit limited, between the external surroundings and the internal volume defined by the enclosure. More specifically, the freely circulating air is capable of carrying specific contaminants, such as germs, spores or bacteria.

In the known manner, the installation generally comprises means for sterilizing the preforms which are intended for decontaminating the preforms before and/or during the thermal conditioning thereof in the oven but, on the other hand, the installation does not comprise means for specific sterilizing or asepticizing which are associated with the blow moulding unit.

More specifically, the preforms are blow moulded by means of sterile air and each preform, during the cycle of its transformation into a container, is introduced inside a mould which therefore insulates said preform by being closed and protects said preform from the risk of specific airborne contamination.

Thus, for a person skilled in the art, it is obvious that the preforms are not exposed to the risk of contamination in this part of the installation and the part of the installation for the manufacture of containers located downstream of the oven is therefore usually devoid of specific means for sterilization or asepticizing.

Nevertheless, counter to the prejudices of the person skilled in the art, it has been established that the containers obtained in the latest generation of installations operating at high production rates surprisingly have specific contamination rates which are higher than the previous threshold values usually observed and this is, however, without the origin of these contaminants being able to be explained.

This is the reason why the applicant has carried out research and tests to establish the origin thereof. Naturally, the theory according to which the contamination of the preforms might originate from a lack of sterilizing means has been dismissed, the origin of these rates of contamination consequently having to be researched elsewhere.

Tests carried out by the applicant have allowed the applicant, on the one hand, to establish that the specific contamination of the preforms might surprisingly occur upstream of the supply zone, in particular in the outlet zone of the oven and, on the other hand, to establish a correlation between the increase in the rate of contamination and the use of increased rotational speed of the wheel of the moulding/blow moulding unit.

In this regard, it will be recalled that, for such installations, production rates have continued to increase, for instance the rotational speed of the wheel of the blow moulding unit nowadays reaches speeds in the order of 20 to 40 revolutions per minute for a wheel having a diameter of between 1 and 4 metres.

In installations operating at very high speeds, the wheel thus causes significant aerodynamic effects inside the enclosure due to its rotational speed.

Research on these effects has, in particular, permitted the applicant to reveal that, when operating at high speeds, the wheel acts as a fan which produces a significant current of air, said current of air passing successively through the peripheral zone surrounding the wheel, then the transfer zone and finally the outlet zone of the oven before being largely discharged from the installation through the upper open part of the oven.

The applicant has thus been able to establish that the origin of the specific contaminants was directly related to the current of air produced by the rotation of the wheel at high speeds.

More specifically, the particles, such as germs, bacteria, etc. are thus capable of being transported by this current of air from the part of the installation comprising the moulding/blow moulding unit and the transfer devices as far as the oven, of which the upper part forms a vent through which the current of air is largely discharged.

This is the reason why both the body and the neck of the preform are, in particular, liable to be contaminated in the outlet zone of the oven, when the preforms proceeding from upstream to downstream are successively swept by the current of air which is capable of carrying specific contamination.

The present invention aims, in particular, to remedy the aforementioned drawbacks and most specifically to remedy the risk of specific airborne contamination by the current of air produced by the high-speed rotation of the moulding unit wheel.

To this end, the invention proposes an installation for the manufacture of containers of the aforementioned type, characterized in that the installation comprises a system for the insufflation of filtered air inside the enclosure to create an excess pressure there, by projecting a flow of air therein which is selectively introduced into at least said first zone so that the current of air produced by the rotation of the wheel consists of said filtered air to avoid the risks of specific airborne contamination, in particular the contamination of the preforms in the outlet zone of the oven.

Advantageously, the first zone Z1 corresponds to the zone of the internal volume of the enclosure which extends transversely to the rear from the supply zone of the moulding unit, which extends vertically from the floor to the ceiling of the enclosure and which is encompassed longitudinally between a lateral part of the wheel carrying the moulds and the opposing wall of the enclosure, said first zone Z1 being the zone in which the current of air originates which is produced by the rotation of the wheel, of which the moulds agitate the air in a manner similar to that carried out by the blades of a fan.

As a result of the invention, the current of air produced by the rotation of the wheel essentially consists of filtered air which is introduced inside the enclosure by the insufflation system, such that the general level of hygiene of the installation is improved thereby, allowing the manufacture at high speed of aseptic or sterile containers in accordance with the usual requirements in terms of specific contamination.

Advantageously, the air forming said current which is created and circulates around the wheel in the direction of rotation thereof, before successively sweeping over the transfer zone and then the outlet zone of the oven, is filtered or sterilized air devoid of particles, such as bacteria or germs.

As a result, the current of air consists solely of "clean" insufflated air of which the quality is controlled and therefore is no longer capable of contaminating the preforms or the containers, in particular the preforms in the outlet zone of the oven.

According to further features of the invention:
the system for the insufflation of air is capable of projecting a flow of filtered air into the second zone and/or the third zone of the enclosure which, complementary to the first zone, define the peripheral zone surrounding the wheel;
the system for the insufflation of air is capable of projecting a flow of filtered air into a fourth zone of the enclosure comprising at least the transfer zone and the outlet zone of the oven;
the system for the insufflation of air is capable of continuously projecting a flow of filtered or sterile air into all or part of the zones of the enclosure, irrespective of the rotation of the wheel, so as to maintain the level of hygiene inside the enclosure by maintaining an excess pressure therein when the wheel is stationary, on the one hand, and to avoid the specific contamination of the current of air produced, during operation, by the rotation of the wheel which acts as a fan, on the other hand, said current of air consisting mostly of said filtered air insufflated by the system passing successively through firstly the peripheral zone formed by said first, second and third zones, then the transfer zone and finally the outlet zone of the oven;
the system for the insufflation of air comprises ventilation means associated with filtering means which are intended to filter the air before its projection into the enclosure;
the filtering means of the system consist of at least one filter of the "HEPA" or "ULPA" type;
the system for the insufflation of air comprises at least one element which is mounted outside the enclosure on at least one of the vertical walls and/or the horizontal wall forming the ceiling, the enclosure comprising openings to allow the insufflation of the flow of filtered air following an initially laminar flow generally flowing vertically from top to bottom;
the elements of the insufflation system are structurally integrated in the enclosure so as to form the wall constituting the ceiling.

Advantageously, the installation is of the type in which the enclosure comprises an airlock intended to allow an operator to access the inside of the enclosure from the outside of the installation, in particular in order to carry out operations on the wheel, such as adjustments or changing the moulds, and the insufflation system of the installation is capable of projecting selectively a flow of filtered air inside the airlock so as to avoid any external contamination of the internal volume defined by the enclosure when the airlock is used.

Preferably the airlock is arranged in the second zone of the peripheral zone which is located to the rear of the wheel and diametrically opposed to the transfer zone.

Further features and characteristics of the invention will become apparent from reading the detailed description which follows, for the understanding of which reference will be made to the accompanying drawings, in which:

FIG. 1 is a schematic view from above which shows an example of an installation for the manufacture of containers comprising a system for the insufflation of filtered air according to the invention;

FIG. 2 is a sectional view of FIG. 1 along the plane 2-2 which shows the moulding/blow moulding unit of the installation and which illustrates the arrangement of the elements of the system for the insufflation of filtered air in the upper part of the enclosure.

In the description and the claims, the terms "upstream" and "downstream", "front" and "rear", "upper" and "lower", "left" and "right", etc. will be used in a non-limiting manner and the orientations "longitudinal", "vertical" and "transverse" will be used to designate respectively elements according to the definitions provided in the description and relative to the trihedron (L, V, T) shown in the figures.

An installation 10 has been shown schematically in FIG. 1 for the manufacture of containers 12, in particular bottles, by blow moulding or stretch blow moulding from a thermoplastic preform 14, for example made of PET (polyethylene terephthalate).

An embodiment of a preform 14 intended for the manufacture of a container with a hollow body, such as a bottle, flask, etc. in particular by blow moulding or by stretch blow moulding has been shown in detail in FIG. 1.

By definition, the term "container" denotes in the remainder of the present description both the final container, such as the bottle 12 illustrated in detail in FIG. 1, which is obtained by a manufacturing method in a single blow moulding step of a preform directly resulting in the final container and an intermediate container obtained when implementing a method with a plurality of blow moulding steps.

The preforms 14 are generally made according to an injection moulding method and are, for example, moulded at a different location from that where the installation for manufacturing containers is located.

As may be seen more clearly in the detail of FIG. 1, the preform 14 generally has a substantially tubular body 16, of cylindrical section according to a horizontal sectional plane, said body 16 extending along a vertical axis, in this case in a position known as "neck down".

The preform 14 is closed at its upper end by a substantially hemispherical base 18, which corresponds to the part of the body of the preform intended to form the base of the container 12. In contrast, the preform 14 is open at its lower end which is shaped into a neck 20 which has already the definitive shape of the neck or mouth of the container 12.

The preform 14 comprises at the join between the body 16 and the neck 20 a flange 22 which extends radially toward the outside, projecting relative to the body 16 and to the neck 20.

The neck 20 defines an annular opening centered on the vertical axis and it comprises, for example, on its external surface a thread intended to allow the subsequent positioning of screw closure means of the container 12, such as a cap (not shown).

As a variant, the neck 20 comprises on its external surface hooking means intended to allow the subsequent positioning of complementary closure means of the container 12 of the type to be clipped or sealed such as a seal made of plastics or metal.

The installation 10 for the manufacture of containers 12 comprises at least one device 24 for supplying preforms 14 which is intended to supply preforms, according to the arrow, to an inlet E of the installation 10.

The installation 10 comprises a thermal conditioning unit 26 comprising at least one oven 28, comprising means for heating 30 the preforms 14 which are arranged between an inlet zone 32 into which the preforms 14 are fed by the supply device 24 and an outlet zone 34 which discharges into a zone 36, known as the transfer zone, of the installation 10.

Preferably, the installation 10 comprises a first transfer device 38 which, arranged in the transfer zone 36, is intended to transfer the thermally conditioned preforms 14 from the outlet zone 34 of the oven 28 as far as a zone 40, known as the supply zone, of a moulding unit 42.

The moulding unit 42 comprises a wheel 44 provided with a plurality of moulds 46 distributed circumferentially and associated means (not shown) for blow moulding or stretch blow moulding.

Preferably, each mould 46 is a mould known as a "jack-knife mould" which comprises a cavity corresponding to the container 12 to be manufactured, for example a bottle.

As a variant, each mould 46 comprises at least two cavities so as to manufacture simultaneously two containers 12 from two preforms 14.

The wheel 44 is driven in rotation so that each mould 46 passes through a transformation cycle from said supply zone 40 as far as a zone 48, known as the discharge zone.

The mould 46 of the wheel 44 positioned in the supply zone 40 is opened so as to permit the introduction of the preform 14 which has been previously thermally conditioned by the oven 28, then closed during the transformation cycle of the preform 14 by blow moulding which operates in parallel with the rotation of the wheel 44 until the mould 46 reaches the discharge zone 48 where it is again opened to allow the discharge of the container 12 obtained.

To achieve this, the installation 10 comprises a second transfer device 50 which, arranged in the transfer zone 36, is intended to transfer the containers 12 obtained from the discharge zone 48 of the moulding unit 42 as far as an outlet S of the installation 10 through which the containers 12 are discharged.

The installation 10 comprises at least one secure enclosure 52 forming a casing which is arranged so as to surround at least the moulding unit 42, the transfer zone 36 and the outlet zone 34 of the oven 28 of the installation 10, said enclosure 52 defining in this manner an internal volume confined around the constituent elements of the installation 10.

Preferably, the secure enclosure 52 defines, in particular around the wheel 44, a peripheral U-shaped zone 54 which extends from the supply zone 40 as far as the discharge zone 48.

The peripheral zone 54 comprises successively a first zone Z1, known as the lateral right-hand zone, a second zone Z2, known as the rear zone, and a third zone Z3, known as the lateral left-hand zone.

Each of said zones Z1 to Z3 has been shown in dotted lines in FIG. 1 by way of indication and corresponds generally to a volume of parallelepiped shape.

Preferably, the secure enclosure 52 consists of an assembly of vertical walls formed, for example, by panels and at least one horizontal wall forming a ceiling (FIG. 2) which advantageously covers the moulding unit 42, the transfer zone 36 and the outlet zone 34 of the oven 28 of the installation 10.

Preferably, the oven 28 of the thermal conditioning unit 26 is vertically open at the top.

The secure enclosure 52 comprises essentially a part surrounding the moulding unit 42 and consisting of a right-hand transverse wall 56 which is adjacent to the supply zone 40 and the outlet zone 34, a rear longitudinal wall 58 and a left-hand transverse wall 60.

The enclosure 52 also comprises a front longitudinal wall 62, generally parallel to the wall 58 which, extending transversely in front of the wheel 44, partially defines the transfer zone 36 comprising the transfer devices 38 and 50.

The enclosure 52 finally comprises a part comprising an assembly of U-shaped walls 64 surrounding the oven 28 which forms a tunnel extending longitudinally, the assembly of the walls 64 defining with the front longitudinal wall 62 a passage forming the inlet E of the installation 10 and joining the right-hand transverse wall 56 to close the enclosure 52.

The assembly of walls 64 opens out longitudinally at the end of the side of the outlet zone 34 of the oven 28, which is adjacent to the transfer zone 36.

The left-hand transverse wall 60 and the front longitudinal wall 62 define a passage forming the outlet S which, adjacent to the second transfer device 50, is intended to allow the discharge of the containers 12 from the installation 10.

The first zone Z1 extends laterally to the right of the wheel 44, more specifically extending longitudinally between the wheel 44 and the opposing right-hand transverse wall 56, transversely to the supply zone 40 to the rear longitudinal wall 58 and vertically from the ground 66 on which the enclosure 52 rests as far as a wall 68 (see FIG. 2) forming the ceiling of the enclosure 52.

The second zone Z2 extends longitudinally to the rear of the wheel 44 and is encompassed transversely between the wheel 44 and the rear longitudinal wall 58 of the enclosure 52 excluding the parts included in the first and third zones Z1 and Z3.

The third zone Z3 extends laterally to the left of the wheel 44, more specifically extending longitudinally between the wheel 44 and the opposing left-hand transverse wall 60, transversely to the rear longitudinal wall 58 to the discharge zone 48 and vertically from the ground 66 on which the enclosure 52 rests as far as the wall 68 forming the ceiling of the enclosure 52.

As has been explained in the preamble, when the wheel 44 is driven in rotation at high speeds, it behaves as a fan of which the blades might be formed by the moulds 46 and produces inside the confined volume delimited by the enclosure 52 a significant current of air C which is shown in FIGS. 1 and 2 by an associated arrow.

More specifically, such a current of air C is capable of transporting specific contaminants present, in particular, in the enclosure zone 52 comprising the moulding unit 42 or the transfer devices 38, 50 until the preforms 14 are located in the outlet zone 34 and in the oven 28.

According to the invention, the installation 10 comprises a system 70 for the insufflation of filtered air inside the enclosure 52 to establish an excess pressure therein by projecting an air flow F therein which is selectively introduced into at least said first zone Z1 so that, in particular during operation, the current of air produced by the rotation of the wheel consists of said filtered air to avoid the risk of specific airborne contamination, in particular the contamination of the preforms in the outlet zone of the oven.

As a result, the current of air C produced during operation by the rotation of the wheel 44 essentially or exclusively consists of the filtered air which is introduced inside the enclosure 52 by the insufflation system 70.

Advantageously, the insufflation system 70 operates continuously, irrespective of the rotation or otherwise of the wheel and thus of the presence of the current of air C, so as to preserve an increased level of hygiene inside the enclosure 52 by maintaining the excess pressure therein by the insufflation of filtered or sterile air when the installation is stationary.

As a result of the invention, the general state of hygiene of the installation 10 is improved and the installation 10 is capable of manufacturing, at high speeds, aseptic or sterile containers 12 which are in accordance with the usual requirements in terms of specific contamination.

Advantageously, after having been produced and enveloped around the wheel 44 in the anti-clockwise direction of rotation thereof, said current of air C which successively sweeps over the transfer zone 36, then the outlet zone 34 of the oven 28, in a longitudinal manner, consists of filtered, even sterile, air, which is devoid of particles, in particular bacteria, spores or germs.

Advantageously, the insufflation system 70 operating continuously in the internal volume of the enclosure 52 and all parts located there have a controlled level of hygiene, i.e. a very low rate of particles so as to prevent any risk of specific contamination of the filtered or sterile flow of air projected through the system or even of the current of air C by particles which might be present inside the enclosure 52.

More specifically, the creation of excess pressure inside the enclosure 52 makes it possible to guarantee continuously that no potentially pathogenic air penetrates from the outside to the inside of the enclosure 52 and this is irrespective of whether the wheel 44 is in rotation.

More specifically, when the insufflation system is in operation, the risks of specific external contamination of the internal volume defined by the enclosure are eliminated and the air present in the enclosure 52 solely consists of filtered air which is discharged from the inside of the enclosure to the outside of the installation 10 due to the excess pressure created by the means 70.

It is in particular for these reasons that the current of air C is no longer capable of contaminating the installation 10 and in particular the preforms 14 in the outlet zone 34 of the oven 28.

Advantageously, a decontamination, for example a chemical decontamination, is carried out of the internal volume of the enclosure 52 before the operation of the insufflation system 70 of the installation 10.

Preferably, the insufflation system 70 operates continuously, independently of the wheel 44 of the installation 10, so as to maintain continuously the hygiene of the installation 10 and in particular of the part comprising the moulding unit 42, the transfer devices 38, 50 and the outlet zone of the oven 28.

Advantageously, the insufflation system of filtered air 70 is still capable of projecting a flow F of filtered air into the second zone Z2 and/or the third zone Z3 of the enclosure 52 which, complementary with the first zone Z1, define in particular the peripheral zone 54 surrounding the wheel 44 of the moulding unit 42.

Preferably, the system for the insufflation of air 70 is capable of projecting a flow F of filtered air into a fourth zone Z4 of the enclosure 52 which is defined as comprising at least the transfer zone 36 in which are arranged the first and second transfer devices 38 and 50 and which also comprises advantageously the outlet zone 34 of the oven 28.

Advantageously, the insufflation system 70 operates permanently at least in the fourth zone Z4 of the enclosure 52 comprising in particular the transfer devices 38 and 50.

Thus, irrespective of the rotation of the wheel 44 of the installation 10, the level of hygiene or cleanliness is always maintained in particular in said zone Z4, in the vicinity of which the moulds are open when the installation 10 is stationary, as during operation, in order to continue respectively with the supply of preforms and the discharge of containers into the aforementioned zones 40 and 48.

Advantageously, the system for the insufflation of air 70 is thus capable of projecting selectively a laminar flow F of filtered or sterile air into all or part of the zones Z1, Z2, Z3 and Z4 corresponding to the internal volume defined by the enclosure 52, irrespective of the rotation of the wheel 44.

As a result of the insufflation system 70 according to the invention, when the wheel is stationary 44, a degree of cleanliness in the internal volume is maintained so that the zones Z1 to Z4 are "clean", i.e. have a specific contamination rate which is advantageously less than or equal to the contamination rate of the current of air C, principally consisting of filtered or sterile air insufflated by the system 70 and which, produced during operation by the rotation of the wheel 44, pass successively through said zones Z1 to Z4.

It has been established that the current of air C originates in the vicinity of the supply zone 40 before successively passing through the peripheral zone 54 formed by said first, second and third zones Z1 to Z3 then the transfer zone 36 and finally at least the outlet zone 34 of the oven 28.

Advantageously, the system for the insufflation of air 70 comprises ventilation means 72 associated with filtering means 74 which are intended to filter the air before its projection inside the enclosure 52 to eliminate the impurities (dust, etc.) therefrom and most particularly the contaminant particles such as bacteria, germs, etc.

Preferably, the filtering means 74 of the system 70 are formed by at least one filter of the "ULPA" type which is an acronym for "Ultra Low Penetration Air".

As a variant, the filtering means 74 of the system 70 are formed by at least one filter of the "HEPA" type which is an acronym for "High Efficiency Particulate Air".

According to a preferred embodiment of the invention illustrated in FIG. 2, the system for the insufflation of air 70 comprises elements or blocks 76 which are mounted outside the enclosure 52 on the horizontal wall 68 forming the ceiling, the enclosure 52 comprising openings 78 to allow the passage of the flow F of filtered air, insufflated according to an initially laminar flow, which generally flows vertically from top to bottom before said flow encounters the current of air C.

Advantageously, the elements 76 of the insufflation system 70 comprise ventilation means 72 and filtering means 74 and are selectively arranged at least above one of the zones Z1, Z2, Z3 and Z4.

Preferably, the elements 76 of the insufflation system 70 are integrated structurally in the enclosure 52 so as to form thereby the horizontal wall 68 of the ceiling and to insufflate filtered or sterile air into the internal volume defined by the enclosure 52 to cover all the zones Z1 to Z4.

The integration of the insufflation system 70 is advantageously provided from the design stage of the installation 10 but it is also possible to equip an existing installation in a simple manner in order to improve the general hygiene and the quality of the manufactured containers 12.

Thus, the elements 76 of the insufflation system 70 are also capable of being attached by fixing to at least one of the vertical walls of the enclosure 52.

Preferably, the enclosure 52 of the installation 10 comprises an airlock 80 intended to allow an operator to access the inside of the enclosure 52 from the outside of the installation 10.

The arrangement of such an airlock 80 in the enclosure 52 makes it possible, in particular, to carry out interventions in particular on the wheel 44 to carry out adjustment operations or changing the moulds 46.

Advantageously, the insufflation system 70 is also capable of insufflating a flow F of filtered air inside the airlock 80 which is preferably arranged in the second zone Z2 of the peripheral zone 54 located to the rear of the wheel 44 and diametrically opposed to the transfer zone 36.

As a variant, the installation 10 comprises additional insufflation means dedicated to the airlock 80 and capable of projecting a laminar flow of filtered air, in particular vertically from top to bottom, so as to maintain the level of hygiene of the internal volume defined by the enclosure 52 by avoiding the risks of specific airborne contamination originating from the outside and from the operator when the airlock 80 is used.

The invention claimed:

1. Installation (10) for the manufacture of containers (12), in particular bottles, by blow moulding or stretch blow moulding from a thermoplastic preform (14), comprising:
    a device (24) for supplying preforms intended for supplying preforms to an inlet (E) of the installation (10),
    a thermal conditioning unit (26) comprising at least one oven (28) comprising means (30) for heating the preforms (14) which are arranged between an inlet zone (32) into which the preforms (14) are fed by the supply device (24) and an outlet zone (34) which discharges into a zone (36) of the installation (10), known as the transfer zone,
    a first transfer device (38) which, arranged in the transfer zone (36), is intended to transfer the thermally conditioned preforms (14) from the outlet zone (34) of the oven (28) to a zone (40), known as the supply zone, of a moulding unit (42),
    the moulding unit (42) comprising a wheel (44) provided with a plurality of moulds (46) distributed circumferentially and associated blow moulding or stretch blow moulding means, the wheel (44) being driven in rotation so that each mould (46) passes through a transformation cycle from said supply zone (40) to a zone (48), known as a discharge zone,
    a second transfer device (50) which, arranged in the transfer zone (36), is intended to transfer the containers (12) obtained from the discharge zone (48) of the moulding unit (42) to an outlet (S) of the installation (10),
    at least one secure enclosure (52) forming a casing, arranged so as to surround at least the moulding unit (42), the transfer zone (36) and the outlet zone (34) of the oven (28) of the installation (10), the enclosure (52) defining in particular around the wheel (44) a peripheral U-shaped zone (54) which, extending from the supply zone (40) as far as the discharge zone (48), successively comprises a first zone (Z1) known as the right-hand lateral zone, a second zone (Z2) known as the rear zone, and a third zone (Z3) known as the lateral left-hand zone, and
    a system (70) for the insufflation of filtered air inside the enclosure (52) to create an excess pressure therein by projecting a flow (F) of air therein which is selectively introduced into at least the first zone (Z1) corresponding to the zone of the internal volume of the enclosure (52) in which a current of air (C) originates which is produced by the rotation of the wheel (44), said first zone (Z1) being encompassed longitudinally between a lateral part of the wheel (44) carrying the moulds (46) and an opposing wall (56) of the enclosure (52), and extending, on the one hand, transversely to the rear from the supply zone (40) of the moulding unit (42) and, on the other hand, vertically from the floor (66) to the ceiling (68) of the enclosure (52) so that the current of air (C) produced by the rotation of the wheel (44) is formed from said filtered air to avoid the risks of specific airborne contamination, in particular the contamination of the preforms (14) in the outlet zone (34) of the oven (28).

2. Installation (10) according to claim 1, characterized in that the system for the insufflation of air (70) is capable of projecting a flow (F) of filtered air into the second zone (Z2) and/or the third zone (Z3) of the enclosure (52) which, complementary to the first zone (Z1), define the peripheral zone (54) surrounding the wheel (44).

3. Installation (10) according to claim 1, characterized in that the system for the insufflation of air (70) is capable of projecting a flow (F) of filtered air into a fourth zone (Z4) of the enclosure (52) comprising at least the transfer zone (36) and the outlet zone (34) of the oven (28).

4. Installation (10) according to claim 1, characterized in that the system for the insufflation of air (70) is capable of continuously projecting a flow (F) of filtered or sterile air into all or part of the zones (Z1, Z2, Z3, Z4) of the enclosure (52) irrespective of the rotation of the wheel (44), so as to maintain the level of hygiene inside the enclosure (52) by maintaining an excess pressure therein when the wheel (44) is stationary, on the one hand, and to avoid the specific contamination of the current of air (C) produced, during operation, by the rotation of the wheel (44) which acts as a fan, on the other hand, said current of air (C) consisting mostly of said filtered air insufflated by the system (70) passing successively through firstly the peripheral zone (54) formed by said first, second and third zones (Z1), (Z2) and (Z3), then the transfer zone (36) and finally the outlet zone (34) of the oven (28).

5. Installation (10) according to claim 1, characterized in that the system for the insufflation of air (70) comprises ventilation means (72) associated with filtering means (74) which are intended to filter the air before its projection inside the enclosure (52).

6. Installation (10) according to claim 5, characterized in that the filtering means (74) of the system (70) consist of at least one filter of the "ULPA" or "HEPA" type.

7. Installation (10) according to claim 1, characterized in that the system for the insufflation of air (70) comprises at least one element (76) which is mounted outside the enclosure (52) on at least one of the vertical walls (56, 58, 60, 62) and/or the horizontal wall (68) forming the ceiling, the enclosure (52) comprising openings (78) to allow the insufflation of the flow (F) of filtered air following an initially laminar flow generally flowing vertically from top to bottom.

8. Installation (10) according to claim 7, characterized in that the elements (76) of the system for the insufflation of air (70) are structurally integrated in the enclosure (52) so as to form the wall (68) constituting the ceiling.

9. Installation (10) according to claim 1, in which the enclosure (52) comprises an airlock (80) intended to allow an operator to access the inside of the enclosure (52) from the outside of the installation (10), in particular in order to carry out operations on the wheel (44), such as adjustments or changing the moulds (46), characterized in that the system for the insufflation of air (70) is capable of selectively projecting a flow (F) of filtered air inside the airlock (80) so as to avoid any external contamination of the internal volume defined by the enclosure (52) when the airlock (80) is used.

10. Installation (10) according to claim 9, characterized in that the airlock (80) is arranged in the second zone (Z2) of the peripheral zone (54) which is located to the rear of the wheel (44) and diametrically opposed to the transfer zone (36).

11. Installation (10) according to claim 2, characterized in that the system for the insufflation of air (70) is capable of projecting a flow (F) of filtered air into a fourth zone (Z4) of the enclosure (52) comprising at least the transfer zone (36) and the outlet zone (34) of the oven (28).

12. Installation (10) according to claim 2, characterized in that the system for the insufflation of air (70) is capable of continuously projecting a flow (F) of filtered or sterile air into all or part of the zones (Z1, Z2, Z3, Z4) of the enclosure (52) irrespective of the rotation of the wheel (44), so as to maintain the level of hygiene inside the enclosure (52) by maintaining an excess pressure therein when the wheel (44) is stationary, on the one hand, and to avoid the specific contamination of the current of air (C) produced, during operation, by the rotation of the wheel (44) which acts as a fan, on the other hand, said current of air (C) consisting mostly of said filtered air insufflated by the system (70) passing successively through firstly the peripheral zone (54) formed by said first, second and third zones (Z1), (Z2) and (Z3), then the transfer zone (36) and finally the outlet zone (34) of the oven (28).

13. Installation (10) according to claim 3, characterized in that the system for the insufflation of air (70) is capable of continuously projecting a flow (F) of filtered or sterile air into all or part of the zones (Z1, Z2, Z3, Z4) of the enclosure (52) irrespective of the rotation of the wheel (44), so as to maintain the level of hygiene inside the enclosure (52) by maintaining an excess pressure therein when the wheel (44) is stationary, on the one hand, and to avoid the specific contamination of the current of air (C) produced, during operation, by the rotation of the wheel (44) which acts as a fan, on the other hand, said current of air (C) consisting mostly of said filtered air insufflated by the system (70) passing successively through firstly the peripheral zone (54) formed by said first, second and third zones (Z1), (Z2) and (Z3), then the transfer zone (36) and finally the outlet zone (34) of the oven (28).

14. Installation (10) according to claim 2, characterized in that the system for the insufflation of air (70) comprises ventilation means (72) associated with filtering means (74) which are intended to filter the air before its projection inside the enclosure (52).

15. Installation (10) according to claim 2, characterized in that the system for the insufflation of air (70) comprises at least one element (76) which is mounted outside the enclosure (52) on at least one of the vertical walls (56, 58, 60, 62) and/or the horizontal wall (68) forming the ceiling, the enclosure (52) comprising openings (78) to allow the insufflation of the flow (F) of filtered air following an initially laminar flow generally flowing vertically from top to bottom.

16. Installation (10) according to claim 2, in which the enclosure (52) comprises an airlock (80) intended to allow an operator to access the inside of the enclosure (52) from the outside of the installation (10), in particular in order to carry out operations on the wheel (44), such as adjustments or changing the moulds (46), characterized in that the system for the insufflation of air (70) is capable of selectively projecting a flow (F) of filtered air inside the airlock (80) so as to avoid any external contamination of the internal volume defined by the enclosure (52) when the airlock (80) is used.

17. Installation (10) according to claim 3, characterized in that the system for the insufflation of air (70) comprises ventilation means (72) associated with filtering means (74) which are intended to filter the air before its projection inside the enclosure (52).

18. Installation (10) according to claim 3, characterized in that the system for the insufflation of air (70) comprises at least one element (76) which is mounted outside the enclosure (52) on at least one of the vertical walls (56, 58, 60, 62) and/or the horizontal wall (68) forming the ceiling, the enclosure (52) comprising openings (78) to allow the insufflation of the flow (F) of filtered air following an initially laminar flow generally flowing vertically from top to bottom.

19. Installation (10) according to claim 3, in which the enclosure (52) comprises an airlock (80) intended to allow an operator to access the inside of the enclosure (52) from the outside of the installation (10), in particular in order to carry out operations on the wheel (44), such as adjustments or changing the moulds (46), characterized in that the system for the insufflation of air (70) is capable of selectively projecting a flow (F) of filtered air inside the airlock (80) so as to avoid any external contamination of the internal volume defined by the enclosure (52) when the airlock (80) is used.

20. Installation (10) for the manufacture of bottles (12) by blow moulding or stretch blow moulding from a thermoplastic preform (14), the installation comprising:
- an installation inlet (E);
- an installation outlet (S);
- a perform-supplying device (24) arranged to supply preforms to the inlet (E) of the installation (10);
- a thermal conditioning unit (26) arranged downstream of the inlet (E), the thermal conditioning unit comprising an inlet zone (32), an outlet zone (34), and an oven (28), the oven comprising perform heaters (30) arranged between the inlet zone (32) into which the preforms (14) are fed by the perform-supplying device (24) and the outlet zone (34);
- a transfer zone (36), the outlet zone (34) of the oven discharging thermally conditioned performs into the transfer zone;
- a moulding unit (42) comprising a wheel (44) and having a supply zone (40) and a discharge zone (48), the wheel (44) provided with at least six moulds (46) distributed circumferentially around the wheel, the wheel being driven in rotation so that each mould passes through a transformation cycle from said supply zone (40) to said discharge zone (48), said moulding unit discharging containers at the discharge zone, the rotation of the wheel (44) acting as a fan creating a current of air (C) moving from said supply zone (40) to said discharge zone (48) and to said outlet zone (34);
- a first transfer device (38) arranged in the transfer zone (36), the first transfer device transferring the thermally conditioned preforms (14) from the outlet zone (34) of the oven (28) to the supply zone (40) of a moulding unit (42);

a second transfer device (50) arranged in the transfer zone (36) adjacent the installation outlet (S), the second transfer device transferring the containers (12) from the discharge zone (48) of the moulding unit (42) to the outlet (S) of the installation (10);

a secure enclosure (52) forming a casing, the enclosure surrounding the moulding unit (42), the transfer zone (36) and the outlet zone (34) of the oven (28), the enclosure (52) defining a peripheral U-shaped zone (54) around the wheel (44) which, the U-shaped zone extending from the supply zone (40) as far as the discharge zone (48), the U-shaped zone successively comprising a first right-hand lateral zone (Z1), a second rear zone (Z2), and a third lateral left-hand zone (Z3), the current of air (C) originating in the first right-hand lateral zone (Z1), said first right-hand lateral zone (Z1) being i) encompassed longitudinally between a lateral part of the wheel (44) carrying the moulds (46) and an opposing wall (56) of the enclosure (52), ii) extending transversely to a rear from the supply zone (40) of the moulding unit (42) and, iii) extending vertically from a floor (66) to a ceiling (68) of the enclosure (52); and an insufflation system (70) for insufflation of filtered air inside the enclosure, the insufflation system creating an excess pressure in the enclosure by projecting a flow (F) of filtered air selectively introduced into the first right-hand lateral zone (Z1), the introduced air corresponding to an internal volume of the enclosure (52) in which a current of air (C) originates by the rotation of the wheel (44), wherein the projected flow (F) of filtered air into the first right-hand lateral zone (Z1) provides that the current of air (C) produced by the rotation of the wheel (44) consists of the filtered air, the insufflation of filtered air inside the first right-hand lateral zone (Z1) of the enclosure avoiding risks of airborne contamination including contamination of the preforms (14) in the outlet zone (34) of the oven (28) by the current of air (C) to said outlet zone (34) being filtered air.

* * * * *